July 3, 1956  E. T. OLSON  2,752,801
FLUID ACTUATED CLAMP
Filed Dec. 11, 1952  2 Sheets-Sheet 1
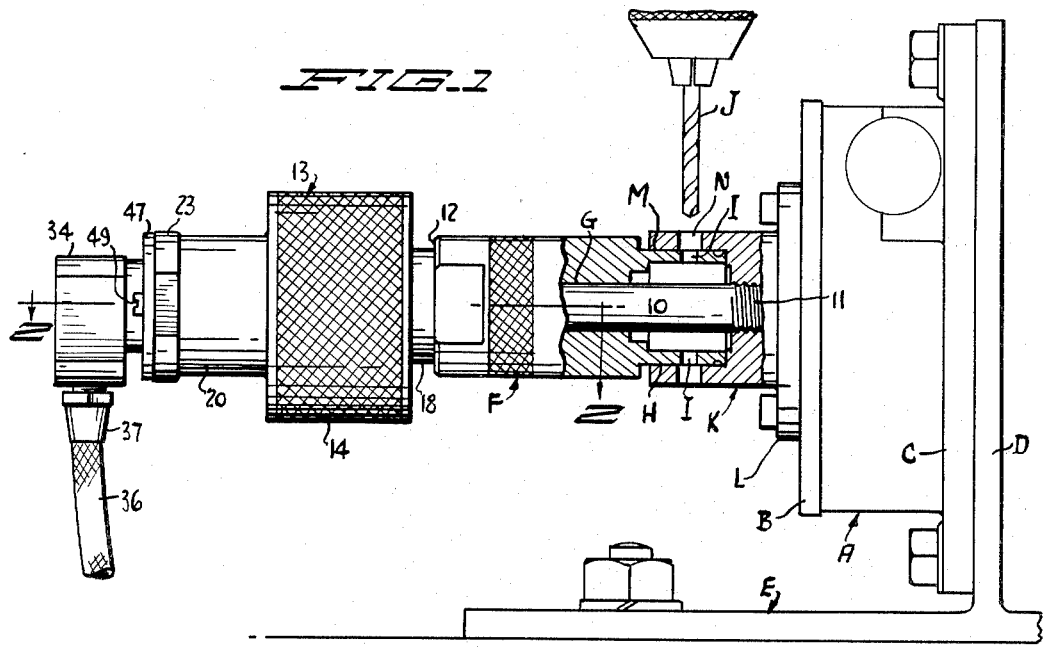
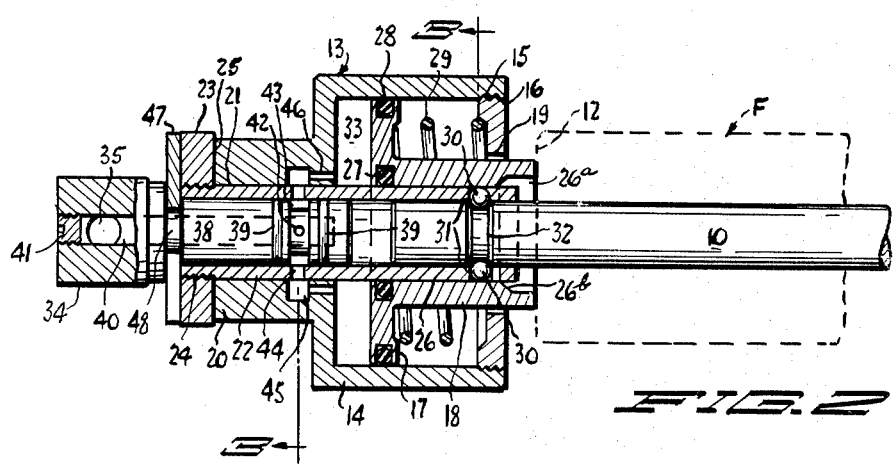
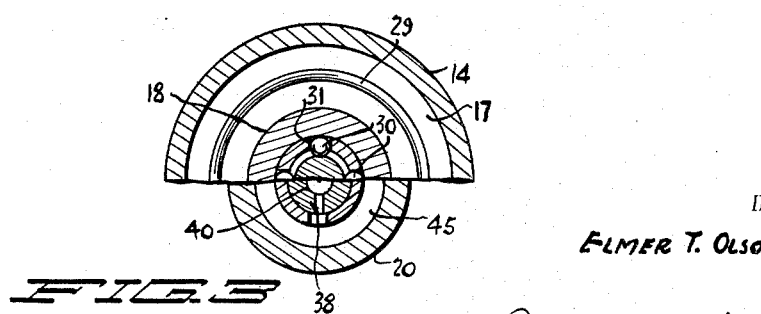
INVENTOR
ELMER T. OLSON
BY
Carlsen + Hazle
ATTORNEYS

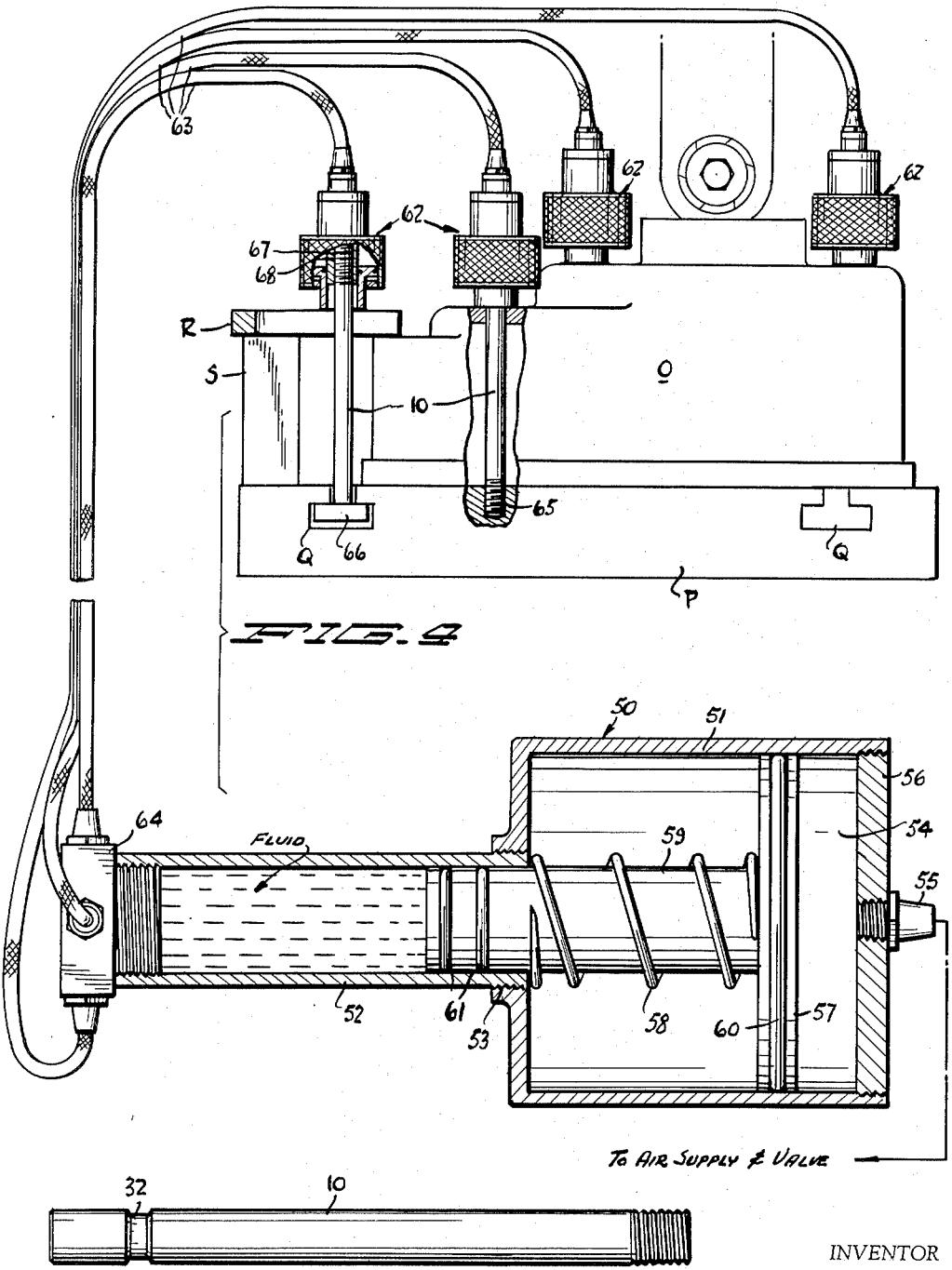

United States Patent Office 2,752,801
Patented July 3, 1956

2,752,801

FLUID ACTUATED CLAMP

Elmer T. Olson, Minneapolis, Minn., assignor of one-half to William J. Rawitzer, Minneapolis, Minn.

Application December 11, 1952, Serial No. 325,406

6 Claims. (Cl. 77—63)

This invention relates to improvements in fluid actuated clamps for clamping and holding work for machine tool operations. The primary object is to provide a clamp which will fill a need not met by the present equipment commonly known as air clamps or air cylinders and which, while it may be operated from the compressed air supply found in every machine shop and plant, may also be fluid actuated where greater clamping and holding pressures are needed.

As the best manner of describing the nature and objects of my invention, I will discuss one particular problem which it solves to perfection, and which is, practically speaking, impossible of solution with ordinary air clamps and cylinders. In the manufacture of a certain item it is necessary to drill a series of evenly spaced radial holes through one end portion of a tubular body part and as is the custom an indexing rotary feed table is used to hold the part, being mounted on a drill press in such position that the part will be accurately indexed on a horizontal axis to bring the locations for drilling in succession up to the drill. The body part is placed in a properly shaped socket in a fixture secured to the rotary feed table and the problem is to clamp the part in said socket. Since the part must rotate a stationarily mounted air clamp or cylinder is useless, of course, and any kind of a manually manipulated clamp using a cam action, or threaded clamp nut, is impractical for various reasons.

In accordance with my invention I have provided a small, light clamp which is used in conjunction with an anchor stud which is secured to the fixture aforesaid and over which the part, being tubular, may be slipped as the end to be drilled is placed in the socket in the fixture. The clamp includes a reciprocating, hollow piston and means responsive to first movement of the piston to firmly anchor the clamp as a whole on the stud and then on continued movement of the piston to force the body part tight into the socket. The clamp is then rotatable with the body part, fixture and feed table and by the provision of a rotary seal air or other operating fluid may be supplied to the clamp without interference with the rotation thereof. I find that this clamp solves this vexing problem in an exceedingly simple and practical way and is so convenient to put in place and remove that the rate of production is very considerably increased.

It will be noted that the clamp of my invention is characterized by the fact that it obtains its hold or purchase, from which clamping pressure is then exerted, on an element (the stud in the example given supra) which moves with the work and that this hold or purchase is releasable for replacement of the work, by contrast with the ordinary air clamp or cylinder which is bolted to some stationary part of the machine and is therefore useless in many situations. It is accordingly an important object of my invention to provide a clamp which is not only light and readily moved about by hand but which includes a means for obtaining a conveniently and instantly releasable purchase from which force may be exerted for clamping the work, be it whatever kind. I do not, of course, limit myself in any way to the specific use and situation of the clamp as enumerated above and in fact it will find many applications where, for instance, heavy slow-acting screw actuated clamps are now used for clamping work as it is milled, planed, etc.

I further contemplate the use of a number of clamps of this nature as may be required for clamping large, awkward work pieces and also have as an object of my invention the use of a bank of the clamps in conjunction with air to hydraulic fluid cylinders for greatly increasing the clamping pressure possible to obtain from the ordinary shop air supply.

These and other more detailed and specific objects will be disclosed in the course of the following specification, reference being had to the accompanying drawings, in which—

Fig. 1 is a side elevation partially in section, illustrating my clamp in its application to the drilling of a tubular body part or work piece, as described hereinbefore.

Fig. 2 is an enlarged diametrical section, taken substantially along the line 2—2 in Fig. 1, showing only a part of the anchor stud and the outline of the work piece in dotted lines.

Fig. 3 is a sectional view taken along the line 3—3 in Fig. 2.

Fig. 4 illustrates the application of a series or bank of the clamps for clamping a heavy work piece, such as a casting, for milling or planing operations and illustrating further a dual cylinder system or combined air and fluid pressure source for actuation of the clamps.

Fig. 5 is an elevation of the anchor stud alone.

Referring now more particularly and by reference characters to the drawing, in Fig. 1 thereof I have shown an indexing, rotary feed table A as a support for the work and which may be of any commercially available type, having a circular face plate B which is rotated in a step-by-step manner by a suitable air cylinder and related mechanism. For my purpose this feed table A has its base C secured to the upright web D of a heavy angle E, which is secured in any suitable fashion to the table of a drill press so that the face plate B will be indexed about a horizontal axis. The drilling operation is to be performed upon a tubular work piece or body part F having a bore G and a reduced end H. The problem is to clamp the work F to the feed table A so that the end H will be indexed about a horizontal axis and so that a plurality of evenly spaced radial holes I may be drilled in the part by the drill J. I provide a fixture K with a base L which is fastened to the face plate B and which has a socket M slidably receiving the end H of the work and which also, of course, has mating openings N to clear the drill. It is necessary, however, to provide some conveniently and quickly operative means for clamping the body parts F in the fixture K, which will permit the parts to be inserted and then removed after all of the holes N are drilled, and since the entire assembly must rotate during the indexing operation a stationary clamp is, of course, impractical.

In accordance with my invention I first of all provide an anchor stud 10 of a diameter such as to nicely, slidably engage the bore G of the work piece F and which stud is firmly secured to the fixture K to rotate therewith as, for example, by threading the parts as designated at 11. The stud 10 is of such length that it will project some distance beyond the end 12 of the work piece F and it is, of course, possible to thread this projecting end of the stud to receive a wing nut as one means for clamping the work piece, but this arrangement is not only too slow for economical production but is also difficult for the operator. I therefore provide what I may refer to in this instance as an air clamp, designated generally at 13, having provision for obtaining a grip or purchase upon the projecting end of the stud 10 and then exerting an axial pressure upon the end 12 of the work piece, forcing the same tightly into the socket H so that this entire assembly will rotate with the fixture K.

The clamp 13 includes a cylinder 14 having an open, tapped end 15 for the accommodation of a washer-like end plate 16. Slidable in the cylinder 14 is a hollow piston 17 having a tubular extension 18 projecting toward the work through an opening 19 in the aforesaid end plate 16. The cylinder 14 at its opposite end has an end extension 20 with an axial bore 21 in which is positioned a sleeve 22 pressed into place and anchored against forward displacement by means of a lock nut 23, threaded at 24 on the sleeve and turned up against the adjacent end 25 of the cylinder. The bore 26 of the piston extension 18 operates slidably over the forwardly extension of the sleeve 22 and interior and exterior seals are provided by inner and outer O-rings 27 and 28. The piston 17 is biased in a direction away from the work by means of a return spring 29, as will be obvious. The bore through the sleeve 22 is of a diameter such as to nicely fit the projecting end of the anchor stud 10 and the clamp assembly is selectively locked or anchored to the stud by means of a series of detent balls 30 located in radial openings 31 in the sleeve and adapted to engage a peripheral groove 32 in the stud. The bore 26 of the piston has an enlarged forward end 26a and when the piston is returned to a normal position by the spring 29 this enlargement 26a will permit the detent balls 30 to move outward to clear the groove 32, so that the clamp may be removed from the stud. However, an annular cam surface 26b is formed in the piston bore and as the piston is urged forwardly toward the work this surface will cam the detent balls 30 into the groove 32 so that the clamp will have a firm hold or purchase upon the stud.

Since all shops are provided with a compressed air supply, I contemplate that the clamp of my invention will ordinarily be operated by compressed air which, when admitted to the chamber 33 behind the piston 17, will force the same forward, camming the detent balls 30 into the groove 32 and then exerting axial pressure between the end of the piston extension 18 and adjacent end 12 of the work piece. Since in this instance the entire clamp must rotate with the work, the air is supplied by what is known as a rotary seal having a head 34 with a lateral opening 35 to which a flexible air hose 36 is attached by means of a conventional fitting 37. The seal further includes a cylindrical spindle 38 rotatably mounted in the sleeve 22 and carrying spaced O-rings 39 by which a rotating air seal is effected. An axial bore 40 through the spindle is plugged at the outer end 41 but transmits air received from the hose 36 to a series of radial ports 42 into a groove 43 in the spindle located between the aforesaid O-rings 39. The air pressure in this groove 43 then flows through registering ports 44 in the sleeve 22 into an annular channel 45 formed in the extension 20 of the cylinder. Finally the air is directed from the channel 45 into the aforesaid chamber 33 through a series of axial ports 46, as clearly evident in Fig. 2. Since the pressures are at balance between the O-rings 39 there is no tendency for this rotary seal to be blown from the clamp, but the same is nevertheless held in place by a notched retainer washer 47, engaging a reduced portion 48 of the spindle and held in place by cap screws 49 threaded into the adjacent lock nut 23.

It will now be apparent that with the parts properly proportioned and sized the groove 32 of the anchor stud 20 is in such position that as the operator slips the clamp 13 upon the stud and then turns on the air the detent balls 30 will be locked into the groove by the first motion of the piston 17 so the the clamp becomes locked against axial displacement upon the stud and away from the work. As the piston continues to travel its end projecting through the end plate 16 will be brought forcibly to bear upon the end 12 of the work piece F and the same will be firmly clamped into the socket H of the fixture K, whereupon the entire clamp may rotate with the work piece as the same is indexed about and the holes I are drilled in succession. When this operation is completed the air pressure effective upon the piston is released whereupon the return spring 29 will free the work piece from the clamping force and will also disconnect the clamp from the stud 20, so that the clamp may be pulled off and a new work piece substituted, ready for the next operation. The application of the clamp to and removal of the same from the work piece is practically instantaneous and due to its compact, light construction it may be readily handled by the operator. I find in actual use that the clamp thus admirably solves this problem not only increasing the production rate but making the work of the operator much easier. It will also be noted that the clamp will operate effectively regardless of minor variations in the over-all length of the work pieces.

Obviously the clamp may vary as to size and proportions according to the work to be done and also other means may be employed for obtaining a purchase upon the stud 10, such as cam dogs or the like, all of which are regarded as within the scope of my invention. Furthermore, since compactness and lightness in a portable and hand manipulated clamp of this nature is a distinct virtue, it follows that the effective clamping pressures are to some extent limited by the fact that the usual shop air pressures are in the neighborhood of one-hundred pounds per square inch. In most cases this limitation is of no moment, but for example in the case of the use illustrated in Fig. 4 where a large, heavy casting O is to be clamped to the support or table P of a milling machine or planer it may be desirable to increase the clamping pressure. I have accordingly shown a dual cylinder assembly, designated generally at 50, having an air cylinder 51 of large diameter from which there axially projects a hydraulic cylinder 52 of smaller diameter, the two being connected by threads 53 or equivalent. Air may be supplied from the shop pressure system to the end 54 of the air cylinder 51 by means of a fitting 55 in the end plate 56 to drive an air piston toward the opposite end against a return spring 58. The air piston 57 drives a plunger 59 operating in the aforesaid cylinder 52 which may be filled with hydraulic fluid, as indicated, and the resulting pressure of the fluid output will be magnified in proportion to the difference in diameter between the respective cylinders, as will be readily understood. Here again O-rings 60 and 61 are illustrated as sealing the respective sliding parts in the cylinders.

While a drive unit of this type may be used with a single clamp of the type preferably described, it will also find ideal application to the powering of a plurality of clamps, as designated throughout generally at 62. Thus a number or a bank of clamps may be used for clamping and holding such large work pieces as that illustrated at O and the fluid supplied to the clamps by an equal number of flexible hoses, designated collectively at 63, connected by means of a cluster fitting 64 into the cylinder 52 to receive fluid at high pressures therefrom. Here again the proper proportioning of the parts will permit a considerable number of clamps to be driven in a single drive unit, as will be readily appreciated. No rotating seal will be necessary where the clamps are thus used, of course.

In the case of an application such as that of Fig. 4 the anchor studs 10 may be threaded, as designated at 65, into the table P or alternatively the studs may be provided with T-shaped ends 66 for engagement with the T-slots Q with which various work tables are customarily provided. In such case the opposite end of the stud is threaded at 67 to screw into the sleeve 68 of the clamp, as shown to the left in Fig. 4, and the stud may be slipped out of the T-slot when the clamp is to be removed. Where the casting or other work piece has suitable openings for the studs 10 the clamps 62 may bear directly upon the work piece, but where this is not the case then the ordinary U-shaped clamp bars R may be used, braced at one end against the work piece and at the other end upon the customery block S and the clamp 62 will then force this bar R firmly against the work piece.

I have found that where relatively high holding pressures are necessary for operation of the clamp then the use of the dual cylinder assembly of Fig. 4, with hydraulic fluid in the cylinder 52 and connected lines, as described hereinbefore is desirable. When the nature of the work being clamped permits use of lower holding pressures, however, then air may be used and delivered directly to the clamp as set forth with reference to Figs. 1–3. I do desire it to be definitely understood that the word "fluid," wherever used in the specification and claims herein, includes either a liquid or a gaseous medium, i. e., air.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. For clamping a work piece to a support, a fluid actuated clamp including an anchor stud fastened to the support, a cylinder having means to receive the stud, a piston slidable in the cylinder, means for admitting fluid under pressure to the cylinder to move the piston therein against the work piece, and means operative by movement of the piston before it reaches the work piece for securing the cylinder to the anchor stud.

2. For clamping a work piece to a support, a fluid actuated clamp of the character described, comprising an anchor stud having means for attachment to the support, a clamp cylinder having a tubular sleeve portion to slip over the anchor stud, a piston slidable in the cylinder and operative by fluid pressure to engage and clamp the work piece, the said stud having a groove, detent balls in the sleeve portion of the cylinder, and means operative by the movement of the piston toward the work piece to force the detent balls inwardly into said groove and anchor the clamp cylinder on the stud.

3. A fluid actuated clamp of the character described for use in conjunction with an anchor stud having a groove, comprising a cylinder having an axial sleeve to slip over the stud and said sleeve having radial openings to register with the groove in the stud, means for supplying fluid under pressure to one end of the cylinder, a piston slidable in the cylinder and movable toward the other end thereof by the fluid, said piston having a tubular extension with an internal cam surface, and detent balls in the openings in the sleeve movable by said cam surface into the groove in the stud as the piston moves for locking the clamp on the stud.

4. A fluid actuated clamp of the character described for clamping a work piece and for use in conjunction with an anchor stud, comprising a clamp cylinder having an axial opening to slip over the stud, a piston slidable in the cylinder, means for supplying fluid under pressure to one end of the cylinder to urge the piston toward the other end of the cylinder, means engaged by the piston and operative by the initial movement of the piston to secure the clamp cylinder upon the stud, and the piston also having means for engaging the work piece.

5. A fluid actuated clamp for clamping work to a rotating support, comprising in combination, a stud secured to the support and projecting therefrom through the work, a clamp cylinder having an axial opening to slip over the stud toward the work, a piston slidable in the cylinder and extending outward therefrom toward the work, a rotating seal means supplying fluid to the cylinder to urge the piston toward the work, and means operative by initial movement of the piston to releasably secure the cylinder to the stud whereby clamping pressure may be exerted by continued movement of the piston up against the work to force the work against the support.

6. A device for clamping a work piece to a support which has a projecting anchor stud, comprising a cylinder having tubular means to slip over the anchor stud, a piston slidably mounted in the cylinder, means for admitting fluid under pressure to said cylinder to project the piston into direct clamping engagement with the work piece, and stud engaging means operative inwardly through said tubular means and by the initial movement of the piston to grip the anchor stud and secure the cylinder against axial displacement as the piston clamps the work piece.

References Cited in the file of this patent

UNITED STATES PATENTS

| | | |
|---|---|---|
| 822,775 | Schnurr | June 5, 1906 |
| 891,945 | Muther | June 30, 1908 |
| 1,024,882 | Domizi | Apr. 30, 1912 |
| 1,373,169 | Clayton | Mar. 29, 1921 |
| 1,420,147 | Roberts | June 20, 1922 |
| 1,883,977 | Landers | Oct. 25, 1932 |
| 2,289,597 | Seat | July 14, 1942 |
| 2,308,099 | Obency | Jan. 12, 1943 |
| 2,373,321 | Lowe | Apr. 10, 1945 |
| 2,651,207 | Olson | Sept. 8, 1953 |